United States Patent [19]
Richardson

[11] Patent Number: 5,213,682
[45] Date of Patent: May 25, 1993

[54] WATER DETECTION MEANS FOR FUEL SUPPLY SYSTEMS

[76] Inventor: Michael T. Richardson, 1237 Brookview Dr., Huron, Ohio 44839

[21] Appl. No.: 737,350

[22] Filed: Jul. 29, 1991

[51] Int. Cl.$^5$ ............................................ B01D 27/10
[52] U.S. Cl. ..................................... 210/86; 210/440; 210/444
[58] Field of Search .................... 210/86, 93, 440, 444, 210/744, 746, DIG. 17; 340/438, 620; 73/304 R

[56] References Cited
U.S. PATENT DOCUMENTS

| | | | |
|---|---|---|---|
| 4,010,101 | 3/1977 | Davey | 210/86 |
| 4,265,262 | 5/1981 | Hotine | 73/304 R |
| 4,410,885 | 10/1983 | Stenstrom | 340/604 |
| 4,638,305 | 1/1987 | Sutton | 210/86 |

Primary Examiner—Matthew O. Savage
Attorney, Agent, or Firm—Frank B. Robb

[57] ABSTRACT

A fuel supply system including a probe device mounted in an outlet passage of a filter head and having probe elements extending into a filter unit which is removably engaged with the head, circuitry in the device responsive to contact with water in the filter to complete a circuit and actuate a signal to indicate the presence of such water, all the foregoing being of importance in the use of fuel filters in fuel lines for handling various fuels.

1 Claim, 1 Drawing Sheet

WATER DETECTION MEANS FOR FUEL SUPPLY SYSTEMS

BACKGROUND OF THE DISCLOSURE AND GENERAL DESCRIPTION

This invention relates to water detection means particularly suited for use in connection with fuel supply systems where the presence of water in a fuel may cause loss of power or even damage to engines which require fuel for their operation.

The presence of water in fuel systems having been found to be power robbing, it is also considered dangerous because when power from an engine is necessary, water in the fuel could result in the inability to deliver power at a crucial point in the operation of such engine for example.

While water detecting means of various kinds are known, they are positioned where failure to properly seal them to prevent leakage or where it is necessary to drain out accumulated water may result in leakage and thus a potential hazard of fire or fumes could result.

Thus the instant invention is provided by a probe construction which includes sensing instrumentalities mounted in a probe unit which is in turn positioned in a filter head mount part. The head mount includes passages into the same and thereby into a filter of the screw on type carried by such head mount and through which fuel flows.

The outlet from the head mount to the place where the fuel is to be delivered, is connected to the filter and sensing instrumentalities extend through the fuel outlet and into the filter unit itself to a position where an accumulation of water will contact the sensing instrumentalities and complete a circuit to provide for signaling that water is present.

The sensing instrumentalities are of a form which will minimize possible damage in handling and in turn provide for actuation of a circuit located in the body of the device.

Since water will settle under fuel in the filter unit, such water will complete the circuit with the instrumentalities as it accumulates and in turn cause the circuit to transmit a signal to a position to indicate the presence of water.

One of the primary advantages of the concept herein is that no unusual special filter or head mount unit is required. A standard filter or head mount unit is used, requiring only to be modified by drilling and tapping a passage as is subsequently to be explained.

The probe unit hereof is inserted in the mount so that the probe instrumentalities thereof extend through and into the filter from above the filter, the filter itself being generally conventional.

The sensing instrumentalities are of a construction which makes the same simple to insert, the instrumentalities further being of resilient form and maintained in spaced relation to prevent inadvertent or vibratory movement which might cause a false signal to be generated.

Further the circuit is incorporated in an outer part of the device and insulated by potting for example.

It is thus possible to insert the probe unit into a mount modified as stated, and use the existing filter without essential change.

Other and further advantages and objects of the invention will be disclosed and described in connection with the drawing showing a preferred form and various views thereof wherein:

FIG. 1, an exploded view of the essential parts in relation to one another.

Figure 1:
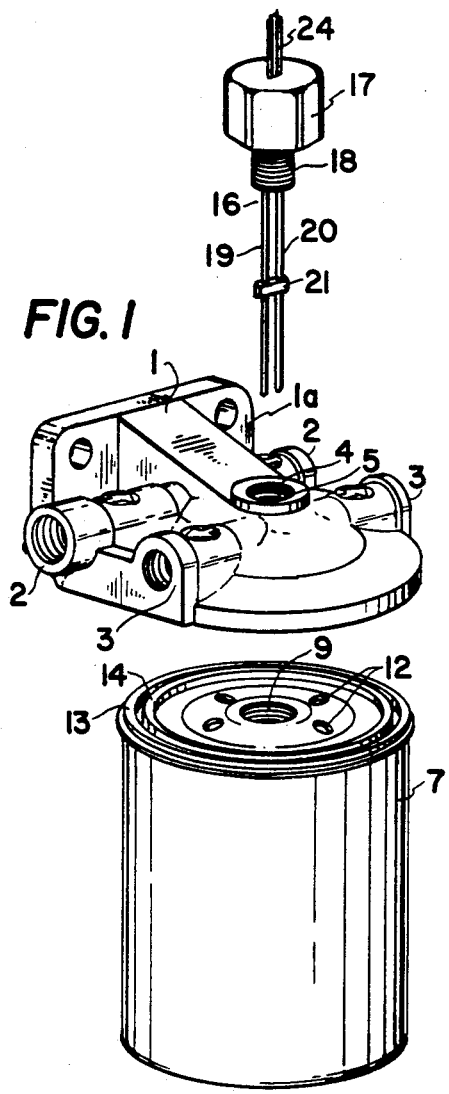
Figure 2:
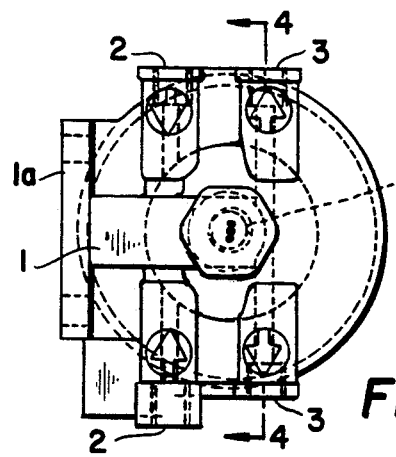
FIG. 2 is a top plan view of a mount.
Figure 3:
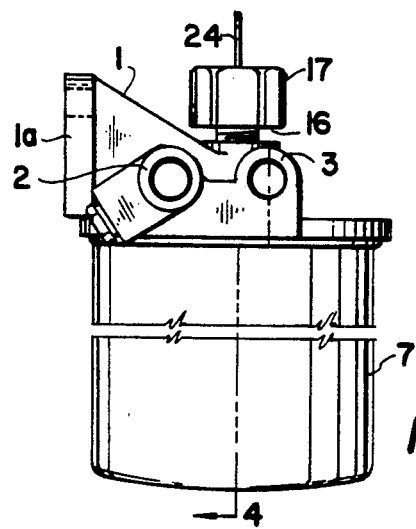
FIG. 3 is a side view of the assembly.

Turning now to the drawing, in FIG. 1 there is disclosed what is known in the trade as a filter mount or a filter mount head generally designated 1, which is of common form and includes therein numerous passages which include passages designated 2 as inlet passages for the admission of fuel into the system and outlet passages 3 from which fuel is directed to an engine or the like which requires such fuel.

A further outlet passage is drilled and tapped to become part of the outlet passages and is designated at 4, threaded at 5 as shown extending generally vertically, the mount 1 being supported by a flange 1a in the preferred position substantially as disclosed being most desirable as will be apparent as this description proceeds.

Figure 4:
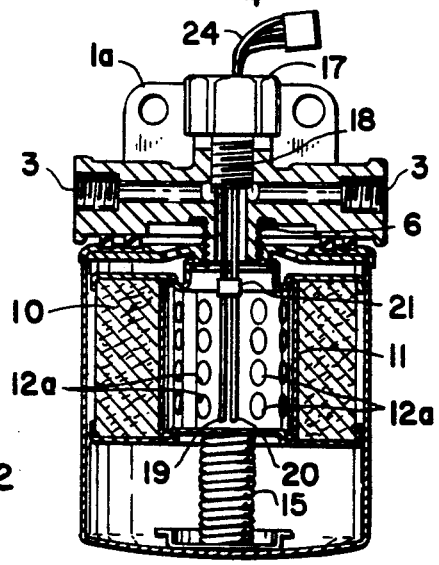
FIG. 4 is a sectional view taken about on Line 4—4 of FIG. 2 looking in the direction of the arrows.

Suitably connected below the mount or head 1, by means of a spud which is shown in FIG. 4 at 6, the same being threaded as will be understood, so as to receive thereon a filter unit 7 which is provided at its upper end, with a fuel opening 9.

It should be explained that the filter unit 7 is a can like structure, hollow and containing therein certain filter parts or filter means which are common and shown particularly in FIG. 4 as comprising a suitable paper element such as 10 positioned around a core 11, which core 11 has suitable passages 12a therein of suitable size to admit fuel after it has passed through the filter element 10 from the upper part as now to be explained.

Referring again to FIG. 1, the filter unit 7 is equipped with a top in which the threaded passage 9 is located and certain openings 12 extend through that top. Additionally certain sealing rings 13 and 14 are provided to effect a sealing engagement of the filter unit and mount as will be apparent and as is common in filter construction such as is here referred to.

As shown in FIG. 4, the filter parts are retained in the position shown in that figure by means of a suitable spring 15 which presses against the lower end of the filter parts and maintains the same in the uppermost position.

With the foregoing in mind, the invention hereof will now be described in relation to the parts which have been referred to, as comprising a probe unit generally designated 16 which further includes a body part 17 of modified hexagonal form and from which extends, below the same a threaded part 18, which part 18 upon suitable manipulation, will engage the threads 5 in the outlet passage 4 previously referred to.

The body part 17 comprises a sensing module of the probe unit now being described is equipped with certain sensing instrumentalities 19 and 20 which comprise parts which are spring-like and of relatively small diameter but of predetermined length for purposes which will appear shortly.

The sensing instrumentalities are positioned for spacing purposes by a strut 21 which engages both of the parts 19 and 20.

Thus the parts 19 and 20 are maintained in their desired position so as not to contact one another.

The probe unit 16 is positioned so as to extend through the opening 4 and the threads 18 engage with the threads 5 in the mount or head 1 and thereby maintain the probe unit 16 in desired position.

It will be apparent from a consideration of FIG. 4 that the lower ends of the sensing instrumentalities extend a substantial distance into the filter unit 7 and their lower ends are in a position to contact water above which the fuel will float as introduced into the filter unit 7 through the inlets 2 previously referred to.

The fuel thereafter passes downwardly through the openings 12 and the filter material 10 and subsequently through the openings 12a in the cylindrical core 11, and envelop the instrumentalities 19 and 20.

Thus if the fuel contains water, as soon as the water reaches the lower ends of the instrumentalities, it will complete a circuit and maintain that contact to thereby provide completion of the circuit for signalling purposes.

Figure 5:
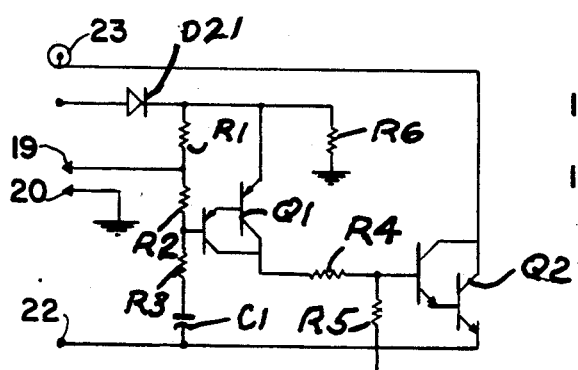
FIG. 5 is a schematic showing circuitry which is used to provide the transfer of a signal.

The circuit as shown in FIG. 5 is contained in the body part 17 and includes circuitry which will actuate a signal for observation or a device which will cause a sound to be audible and thus call attention of the operator to the fact that there is water in the system.

The circuitry which may be used to effect signalling is as disclosed in FIG. 5 and consists of suitable electronic devices which are connected to power from an ignition system the power source denoted 21 for positive and 22 for ground.

Until the ignition is turned on, the sensing instrumentalities are unpowered.

When the ignition is turned on power from 21 is applied through diode D1, which is a reverse polarity protection diode and through resistors R1, R2 and R3 to capacitor C1.

Capacitor C1 loads the circuit during this power initiation sequence, thus causing a simulation of the presence of water or other conductive medium, or a short between the sensor instrumentalities.

With this loading Q1 turns on and conducts to Q2 through resistor R4. Resistor R5 would normally keep transistor Q2 from floating into conduction unless transistor Q1 were on. Transistor Q1 thus supplies a signal to transistor Q2 that amplifies the signal to drive a larger load such as that of indicator lamp 23.

As capacitor C1 charges to the ignition voltage, transistor Q1 turns off and so does Transistor Q2. This is a simple power up lamp test.

When water makes a conductive path between the sensing instrumentalities 19 and 20, transistor Q1 will again turn on and so will transistor Q2, with lamp 23 lighting subsequently. Resistor R6 is a load resistor to discharge capacitor C1 after power down so that within a few seconds upon powerup capacitor C1 will be discharged and the lamp test will function again.

I claim:

1. A fuel filter comprising:
a spin-on fuel filter including a cylindrical housing having a closed end and an open end, and end plate attached to said open end, said end plate including an outlet port located therein and inlet port means surrounding said outlet port, means surrounding said inlet port means for sealing said end plate to a filter mount head, a fuel filter element positioned within said housing and interposed between said inlet port means and said outlet port, said filter element defining space therein sealed to and communicating with said outlet port and extending in said cylindrical housing to an area adjacent the closed end of said housing;
a filter mount head for supporting said fuel filter, said head including an inlet passage, a passage for receiving a water detection sensor, and a hollow spud engaged with the outlet port of said spin-on fuel filter, said hollow spud defining a passage therein, the passage within said spud and said passage for receiving a water detection sensor communicating with one another; and
a water detection sensor including a body portion, a mounting portion connected to and extending from said body portion, said mounting portion being engaged with said passage for receiving a water detection sensor in said mount head, a pair of resilient, spaced, straight, and parallel conductive wires connected to and extending from said mounting portion, said wires extending through the passage in said hollow spud and into the space within said fuel filter element, said wires including a pair of free ends terminating at a common level in proximity to the closed end of said housing, strut means interconnecting said wires at a point between said mounting portion and said free ends for preventing said wires from contacting one another, and circuit means contained within said body portion and connected to said wires for providing a signal when the free ends of said wires contact water.

* * * * *